United States Patent [19]

Kim

[11] Patent Number: 5,581,469

[45] Date of Patent: Dec. 3, 1996

[54] APPARATUS FOR CHECKING THE LIFETIME OF HOUSEHOLD ELECTRONIC OR ELECTRIC APPLIANCES

[75] Inventor: Shin J. Kim, Kyungki-do, Rep. of Korea

[73] Assignee: Goldstar Co., Ltd., Seoul, Rep. of Korea

[21] Appl. No.: 261,130

[22] Filed: Jun. 14, 1994

[30] Foreign Application Priority Data

Jun. 17, 1993 [KR]  Rep. of Korea .................. 1993-11101

[51] Int. Cl.⁶ .................................................. G11B 15/64
[52] U.S. Cl. .................... 364/481; 364/569; 360/122; 360/126; 369/19; 369/44.38; 377/16
[58] Field of Search .................................. 377/15, 16, 13; 364/550, 424.02, 569, 481; 360/137, 120–126; 369/19, 106, 112, 12, 44.38; 420/125, 128

[56] References Cited

U.S. PATENT DOCUMENTS

| | | | |
|---|---|---|---|
| Re. 33,402 | 10/1990 | Thoush ................................ | 360/33.1 |
| 4,575,803 | 3/1986 | Moore ..................................... | 364/551 |
| 4,764,715 | 8/1988 | Kowalewski et al. ..................... | 320/13 |
| 4,897,747 | 1/1990 | Meunier et al. ......................... | 360/122 |
| 5,013,580 | 5/1991 | Meunier et al. ......................... | 427/39 |
| 5,029,188 | 7/1991 | Lexa ......................................... | 377/16 |
| 5,231,594 | 7/1993 | Knibiehler et al. ................. | 364/551.01 |
| 5,434,735 | 7/1995 | Masuda et al. ..................... | 360/130.24 |

Primary Examiner—Emanuel T. Voeltz
Assistant Examiner—Kamini Shah

[57] ABSTRACT

There is provided a device for checking the lifetime of household electronic or electric appliances. This device checks actual energization time and enhances the lifetime by improving the likelihood of service at optimal intervals. The device includes a sensor for outputting signals indicating that the electronic or electric appliance is energized, a memory storing energization time, a signal input unit for inputting inquiry signals from a user wishing to check the lifetime of the electronic or electric appliance, a display, a microprocessor for determining accumulated energization as a function of signals from the sensor, storing an updated energization time back into the memory, and selectively controlling the display to display the energization time.

14 Claims, 3 Drawing Sheets

APPARATUS FOR CHECKING THE LIFETIME OF HOUSEHOLD ELECTRONIC OR ELECTRIC APPLIANCES

BACKGROUND OF THE INVENTION

The present invention relates to an apparatus for checking the lifetime of electronic or electric appliances and more particularly to an apparatus for checking the lifetime of household electronic or electric appliances. This enables users to check the use time of appliances (household electronic or electric appliances) accumulatively and consequently enhances the lifetime of appliances by improving the likelihood of service at optimal intervals.

Conventionally, in the operation of household electronic or electric appliances such as VCR, TV, etc., it is difficult for users to grasp actual use time due to lack of display function of actual use time, therefore, regular service is not possible.

SUMMARY OF THE INVENTION

Accordingly, it is an object of the present invention to provide an apparatus for checking life time of household electronic or electric appliances which improves service and prevents accidents due to wear of the apparatus beforehand by adding up actual use time of appliances accumulatively.

In order to achieve aforementioned object, there is provided an apparatus for checking life time of household electronic or electric appliances comprising a signal input unit for inputting signals to count actual use time, a microprocessor for counting and operating actual use time, a drive unit for outputting driving signals of household electronic or electric appliances, a nonvolatile memory for storing accumulated use time, and a display by which users can ascertain actual use time.

The present invention will be better understood with reference to the following detailed description and the accompanying drawings.

DETAILED DESCRIPTION OF THE INVENTION

Figure 1:
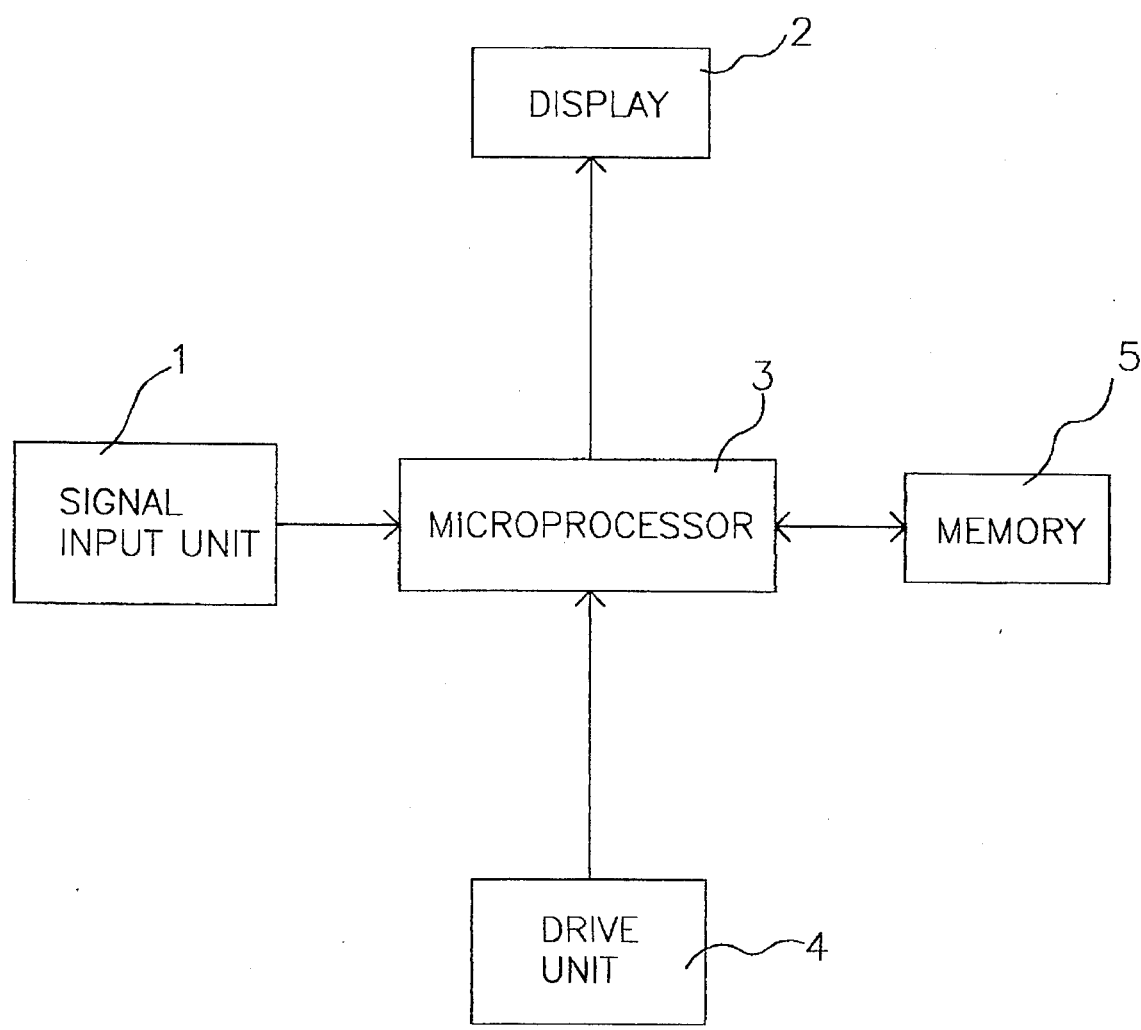
FIG. 1 is a block diagram of an apparatus for checking life time according to the present invention.

Referring to FIG. 1, the apparatus for checking lifetime according to the present invention includes a signal input unit 1, comprising a keyboard or a remote control transmitter, to input control signals, a drive unit 4 outputting driving signals of respective household electronic or electric appliances, a microprocessor 3 counting, operating, and accumulating actual use time by inputting the driving signals of the drive unit 4, a nonvolatile memory 5 storing use time operated and accumulated by the microprocessor 3, and a display 2 showing accumulated use time according to selecting signals of the signal input unit 1.

Figure 2:
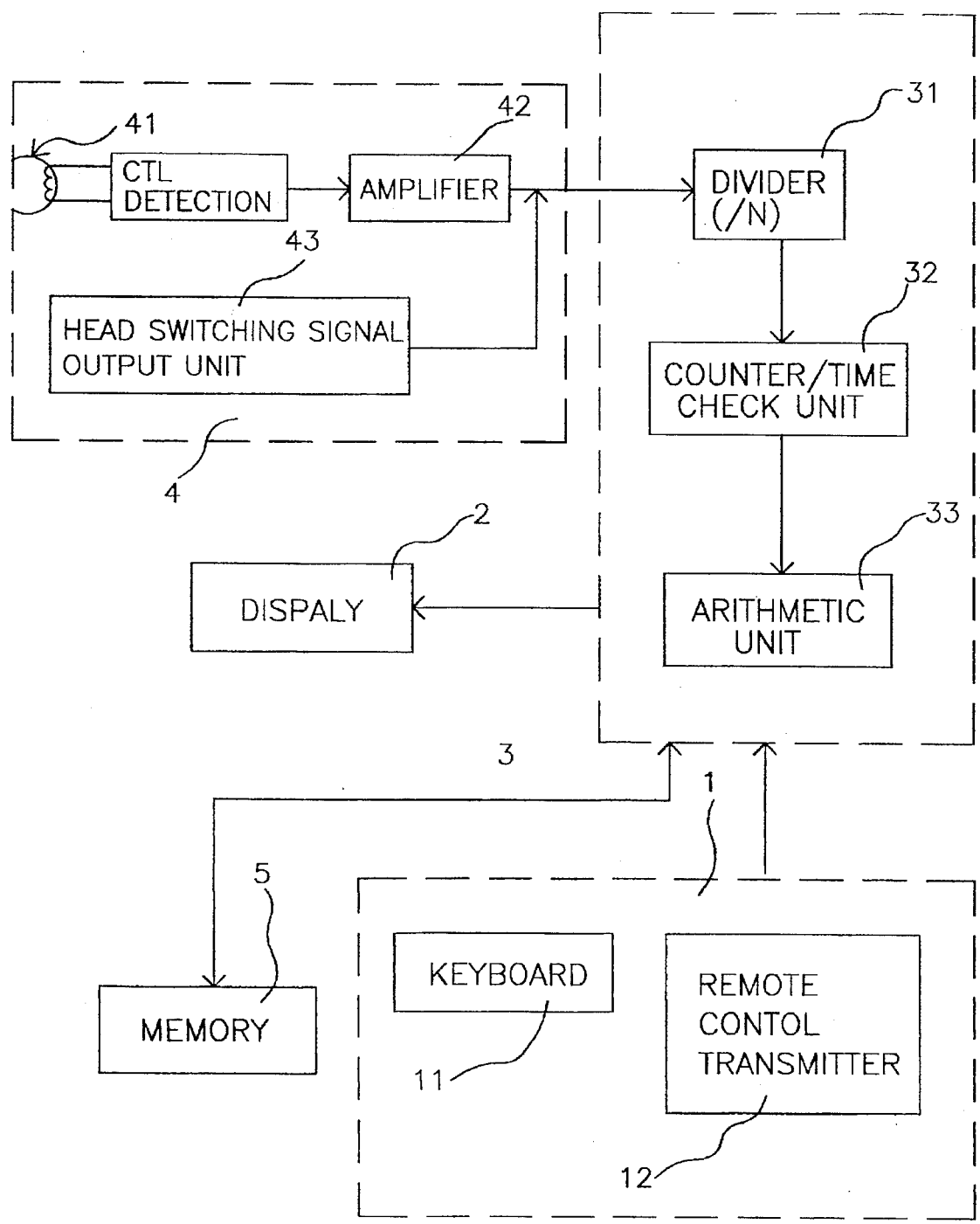
FIG. 2 is a schematic block diagram of the apparatus for checking life time in VCR as an embodiment of the present invention.

FIG. 2 is a block diagram of the apparatus for checking lifetime as an embodiment applying the present invention to a VCR. The apparatus for checking life time in a VCR includes a drive unit 4, a microprocessor 3, a nonvolatile memory 5 storing actual use time operated accumulatively, a signal input unit 1, and a display 2 displaying use time.

The drive unit 4 comprises a control head 41 and an amplifier 42 amplifying signals detected from the control head 41 and outputting driving time of appliances in read mode, and a head switching signal output unit 43 outputting driving time of appliances in record mode.

The microprocessor 3 comprises a divider 31 making the driving signals inputted from the drive unit 4 into real time clock by dividing N times, a counter/time check unit 32 counting real time clock divided by the divider 31, and an arithmetic unit 33 operating and accumulating accumulated time recorded at the memory 5 and signals inputted from the counter/time check unit 32 and then recording them again at the memory 5.

The signal input unit 1 comprises a keyboard 11 or a remote control transmitter 12 which enables users to input signals for displaying accumulated real time.

Figure 3:
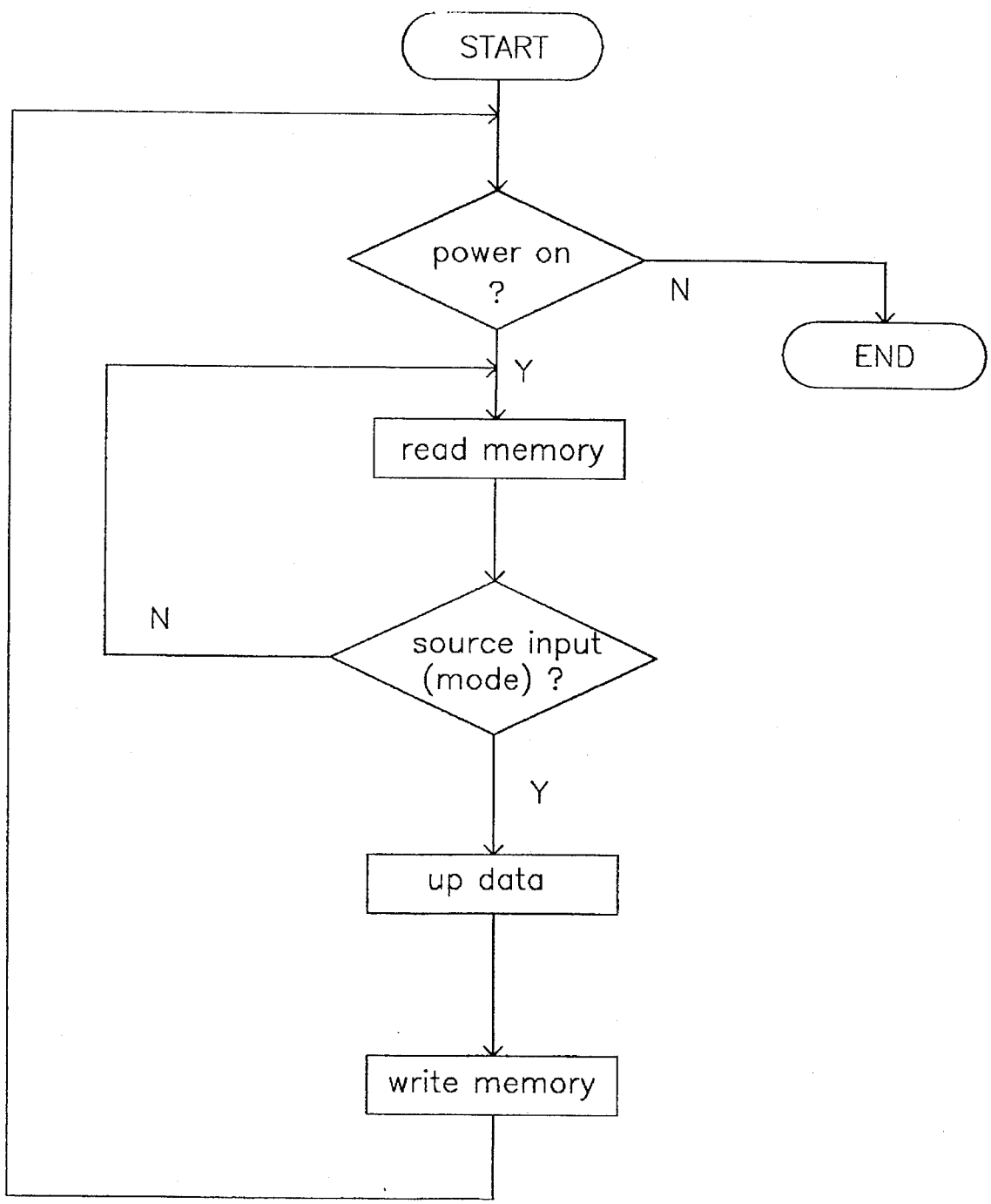
FIG. 3 is a flow chart showing the operation checking life time according to the present invention.

A procedure for checking lifetime in VCR is explained hereinafter with reference to FIG. 3 which shows an operating procedure of an embodiment of the present invention.

Since the use of VCR is divided into playback and record, the driving signals detected from the control head 41 are amplified by the amplifier 42 and then inputted into the divider 31 of the microprocessor 3 in playback mode, and the signals from the head switching signal output unit 43 are inputted into the microprocessor 3 in record mode.

The divider 31 of the microprocessor 3 makes the driving signals inputted from the drive unit 4 into real time clock signals by dividing N times and outputs them into the counter/time check unit 32.

The counter/time check unit 32 counts real time clock signals, obtains actual use time, and records it at the nonvolatile memory 5.

The arithmetic unit 33 operates and accumulates the time recorded at the memory 5 and the actual use time counted at the counter/time check unit 32, and then accumulates actual use time at the memory 5 by recording them at the memory 5 repeatedly.

If users input key signals to know accumulated actual use time by means of the keyboard 11 or the remote control transmitter 12 of the signal input unit 1, then the users can know actual use time accumulated up to now by displaying it through the display 2.

Because the speed of the driving signals from the control head 41 in speed change mode of VCR, such as FF, REW, etc., is different from that in play mode, real time clock signals are obtained and actual use time is counted by checking signals inputted from the signal input unit 1 by means of the microprocessor 3 and controlling the dividing number of times of the divider 31 in speed change mode.

In addition to the method counting, operating, accumulating, and recording actual use time through inputting the driving signals from the drive unit 4, actual use time is accumulated and recorded by checking power-on time as another embodiment.

In the aforementioned apparatus for checking lifetime, the estimated lifetime of appliances and actual use time are compared and a wear quantity is checked by checking actual use time of electronic or electric appliances accumulatively. This prevents accidents due to wear by enabling the scheduling of regular service, resulting in efficient service. In addition, the manufacturers of electronic or electric appliances can check operating the lifetime of specific parts, sustain the lifetime, and improve quality of appliances.

While specific embodiments of the invention have been illustrated and described, it is realized that modifications and changes will occur to those skilled in the art. It is therefore to be understood that the appended claims are intended to cover all modifications and changes as fall within the true spirit and scope of the invention.

What is claimed is:

1. An apparatus for checking the lifetime of a video cassette recorder, comprising:
   a sensor for outputting signals indicating that a mechanical part of the video cassette recorder is energized;
   a memory for storing energization time of the mechanical part; and
   a microprocessor for determining accumulated energization time of the mechanical part as a function of the signals from the sensor and for updating the energization time in said memory.

2. An apparatus for checking the lifetime of a video tape player, comprising:
   a sensor for outputting signals indicating that the video tape player is energized, the sensor having a control head which generates signals during a playback mode of the video tape player;
   a memory for storing energization time; and
   a microprocessor for determining accumulated energization time of the video tape player as a function of the signals from the sensor and for updating the energization time in said memory; wherein
   said sensor further includes an amplifier for amplifying the signals of said control head during the playback mode of the video tape recorder; and
   the sensor senses energization of the control head.

3. An apparatus for checking the lifetime of an electronic or electric appliance comprising:
   a sensor for outputting signals indicating that the electronic or electric appliance is energized;
   a memory for storing energization time; and
   a microprocessor for determining accumulated energization time of the device as a function of the signals from the sensor and for updating the energization time in said memory,
   wherein said microprocessor comprises:
      a divider dividing the signals of said sensor using a divisor N to form real time clock signals,
      a counter/time check unit counting the real time clock signals, and
      an arithmetic unit for summing an energization time stored in said memory and the signals of said counter/time check unit to form an updated accumulated energization time, and
      the microprocessor storing the updated accumulated energization time in said memory.

4. An apparatus for checking the lifetime of an electronic or electric appliance according to claim 4 wherein said divider selects the divisor N according to a speed change mode of a video tape recorder and outputs real time clock signals.

5. An apparatus for checking the lifetime of a video cassette recorder according to claim 1, wherein energization time is power-on time of the mechanical part and said microprocessor accumulates power-on time of the mechanical part.

6. An apparatus for checking the lifetime of a video cassette recorder according to claim 1, wherein said memory is a nonvolatile memory.

7. An apparatus as in claim 1, further comprising:
   a display device;
   the microprocessor controlling the display device to display the energization time.

8. An apparatus as in claim 7, further comprising:
   a user input device for inputting a user inquiry signal regarding the lifetime of the video cassette recorder;
   the microprocessor controlling the display device to display the energization time as a function of the user inquiry signal.

9. A method for checking the lifetime of an electrically energized device, comprising:
   a) sensing when the device is energized and outputting sensed signals indicative thereof; and
   b) determining accumulated energization time of the device as a function of the sensed signals,
   wherein the step b) includes:
      b1) dividing the sensed signals using a divisor N to form real time clock signals;
      b2) counting the real time clock signals to form a count;
      b3) reading the accumulated energization time from the memory;
      b4) summing the accumulated energization time and the count to form an updated accumulated energization time;
      b5) treating the updated accumulated energization time as the accumulated energization time and storing the accumulated energization time in memory.

10. A method as in claim 9 further comprising:
    c) storing the accumulated energization time in memory;
    the step b) determining accumulated energization time as a function of the sensed signals and the stored accumulated energization time.

11. A method as in claim 9, wherein:
    the device is a video tape recorder including at least a recording head and a playback head;
    recording/playback occurs in a plurality of speed modes; and
    the divisor N is selected according to the speed mode by which a head is being energized.

12. A method for checking the lifetime of a video tape recorder having a recording head, comprising:
    a) sensing when the video tape recorder is energized and outputting sensed signals indicative thereof; and
    b) determining accumulated energization time of the video tape recorder as a function of the sensed signals,
    wherein:
       the step a) includes sensing when the recording head is energized and outputting a sensed signal indicative thereof; and
       the accumulated energization time includes accumulated recording head energization time.

13. A method for checking the lifetime of a video tape recorder having a playback head, comprising:
    a) sensing when the video tape recorder is energized and outputting sensed signals indicative thereof; and
    b) determining accumulated energization time of the video tape recorder as a function of the sensed signals,
    wherein:
       the step a) includes sensing when the playback head is energized and outputting a sensed signal indicative thereof; and
    the accumulated energization time includes accumulated playback head energization time.

14. An apparatus for checking the lifetime of an electronic or electric appliance comprising:

a sensor having a head switching signal output unit outputting head switching signals during a time when the electronic or electric appliance is energized;

a memory for storing energization time; and a microprocessor for determining accumulated energization time of the device as a function of the head switching signals from the head switching signal output unit and for updating the energization time in said memory.

* * * * *